(12) United States Patent
Tanaka et al.

(10) Patent No.: US 7,876,915 B2
(45) Date of Patent: Jan. 25, 2011

(54) AUDIO APPARATUS HAVING TUNER UNIT AND DIGITAL REPRODUCING UNIT

(75) Inventors: Yozo Tanaka, Kanagawa (JP); Masahiro Otsu, Kanagawa (JP); Hirotaka Oosuka, Tokyo (JP); Masayuki Mizuki, Tokyo (JP)

(73) Assignee: Sony Corporation, Tokyo (JP)

( * ) Notice: Subject to any disclaimer, the term of this patent is extended or adjusted under 35 U.S.C. 154(b) by 996 days.

(21) Appl. No.: 10/807,926

(22) Filed: Mar. 24, 2004

(65) Prior Publication Data

US 2005/0090214 A1    Apr. 28, 2005

(30) Foreign Application Priority Data

Mar. 28, 2003   (JP) ............................ P2003-092330
Feb. 16, 2004   (JP) ............................ P2004-038488

(51) Int. Cl.
*H02B 1/00* (2006.01)
*H04R 29/00* (2006.01)
*H04B 1/00* (2006.01)
*H04B 1/10* (2006.01)
*H04B 1/16* (2006.01)
*H04B 1/06* (2006.01)
*H05K 11/00* (2006.01)

(52) U.S. Cl. ........................... 381/123; 381/58; 381/77; 381/86; 455/296; 455/343.1; 455/344

(58) Field of Classification Search ................ 381/123, 381/58, 73.1, 124, 94.5, 105, 86, 77, 81, 381/302, 2, 7, 11; 455/296, 343.1, 344
See application file for complete search history.

(56) References Cited

U.S. PATENT DOCUMENTS

| | | | | |
|---|---|---|---|---|
| 5,130,961 A | * | 7/1992 | Namiki et al. | .................. 369/6 |
| 5,450,624 A | * | 9/1995 | Porambo et al. | ......... 455/226.4 |
| 5,692,058 A | * | 11/1997 | Eggers et al. | ................ 381/107 |
| 2003/0009772 A1 | | 1/2003 | Karr | |

FOREIGN PATENT DOCUMENTS

| | | |
|---|---|---|
| JP | 3-44882 | 2/1991 |
| JP | 8-307783 | 11/1996 |
| JP | 10-21650 | 1/1998 |

OTHER PUBLICATIONS

European Search Report dated Dec. 20, 2007.

* cited by examiner

*Primary Examiner*—Vivian Chin
*Assistant Examiner*—Douglas J Suthers
(74) *Attorney, Agent, or Firm*—SNR Denton US LLP

(57) ABSTRACT

An audio apparatus comprises a tuner for receiving broadcast waves; a digital reproducing unit; operation switches for operating the tuner and the digital reproducing unit; and a control unit for controlling the tuner and the digital reproducing unit in response to an operation of the operation means. In a first mode of operation, the control unit controls if an audio signal from the tuner is selected as a source such that the power of the digital reproducing unit is turned on, and wherein, in a second mode operation, the control unit controls if an audio signal from the tuner is selected as a source such that the power of the digital reproducing unit is turned off, alternatively if an audio signal from the digital reproducing unit is selected as a source, the power thereof is turned on.

10 Claims, 5 Drawing Sheets

| FLAG CDPWRF \ FUNCTION | BROADCAST RECEIVING | CD/CASSETTE/ LINE INPUTS (MD) |
|---|---|---|
| "1" | ON | ON |
| "0" | OFF | ON |

POWER CONTROL OF CD PLAYER

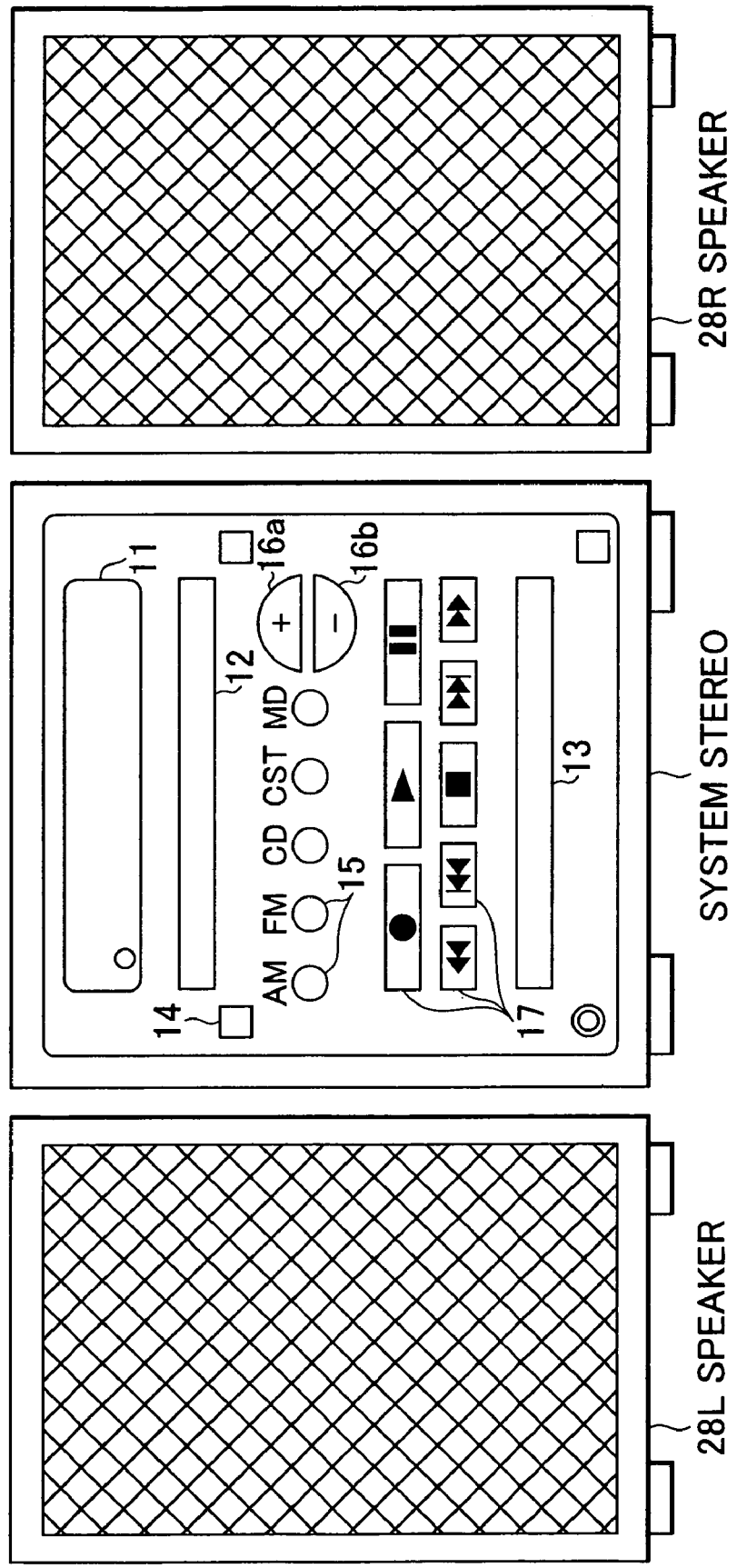

US 7,876,915 B2

AUDIO APPARATUS HAVING TUNER UNIT AND DIGITAL REPRODUCING UNIT

RELATED APPLICATION DATA

The present application claims priority to Japanese Application(s) No(s). P2003-092330 filed Mar. 28, 2003, and P2004-038488 filed Feb. 16, 2004, which application(s) is/are incorporated herein by reference to the extent permitted by law.

BACKGROUND OF THE INVENTION

1. Field of the Invention

The present invention relates to an audio apparatus, and in particular, to an audio apparatus including a tuner unit and a digital reproducing unit.

2. Description of the Related Art

As a consumer-use audio apparatus, there is a so-called system stereo. This system stereo, for example, is comprised of an AM-FM tuner, recording/reproducing components such as a cassette tape recorder, a compact disc (CD) player, a mini disc (MD) recorder/player and the like, and they are integrated and housed in a single cabinet.

FIG. 6 is a frontal view showing one example of a specific appearance of such system stereo. This system stereo in this example can handle AM/FM broadcasts, a CD, a compact cassette as its source, and optionally an MD recorder/player unit is connected if desired.

This system stereo is formed generally into a rectangular shape, and on the front panel there are provided a display 11, a CD disc tray 12, and a cassette loading slot 13. Also, on the front panel there are provided a power on-off 25 key 14, function keys 15, a volume up-down key 16a, 16b, and operation mode control keys 17.

In this example, these keys 14 to 17 are composed of non-lock type push button switches. The function keys 15 are provided for switching over the sources, and by pushing this function key 15, either of the AM broadcast tuner, FM broadcast tuner, a CD player, a cassette player, or a MD recorder/player can be selected. Further, the operation mode control key 17 serves to shift a receiving frequency to receive a desired broadcast station when receiving AM or FM broadcast waves, as well as serves to switch a mode of operation between a reproducing mode, a pause mode, a stop mode, etc. when using the CD player or cassette recorder/player.

Further, on the left and the right sides of the system stereo, there are disposed a pair of speakers 28L and 28R for left and right channels, respectively. A system control of this system stereo is executed by a built-in microcomputer (not shown).

Therefore, according to this system stereo described above, advantages in space-saving, a reduced production cost, and the like can be achieved, and also eliminating the need of messy wiring around of cables between respective components.

However, this system stereo as described above has such a drawback that radio frequency noise components of a clock of the built-in microcomputer for use in the system control reaches an AM or FM frequency bands and interferes with the reception of the AM or FM broadcast waves.

Therefore, it is arranged in some of the system stereos such that while receiving broadcast waves, a clock frequency of the microcomputer is slightly shifted corresponding to the receiving frequency of the broadcast so as to ensure for the radio frequency noise components of the clock not to coincide with or come into the vicinity of the receiving broadcast frequency, thereby preventing the interference with the reception of broadcasting. Here, the Japanese Patent No. 3122102 is referred to as a related art.

Generally, a CD player or an MD recording/reproducing unit executes a digital processing of audio signals, and also various controls thereof is digitally processed. Therefore, radio frequency noise components which reaches AM or FM frequency bands are also generated in the CD player and MD recording/reproducing unit. In addition, in the system stereo as described above, the tuners of AM broadcast and FM broadcast as well as the CD player are disposed in the same cabinet.

Thereby, it often occurs that radio frequency noise components generated in the CD player readily enters the tuner thereby causing interference with the reception of broadcasting, in particular, the reception of AM broadcast waves. That is, in case of receiving broadcast waves from a local station, as a signal level of the received signal is substantially high, the radio frequency noise components of the CD player are suppressed by an automatic gain control (AGC), thereby causing no problem effectually. However, in case of receiving broadcast waves from a remote station or under a weak receiving condition, its reception is likely to be affected by the radio frequency noise components due to a weak signal level of the received signal.

In order to solve this problem as described above, the power of the CD player may simply be turned off when receiving the broadcast waves. That is, when listening to a radio broadcast station, as it is not required to reproduce a CD, there will be no problem even if the power of the CD player is turned off. If the power of the CD player is turned off, the CD player no more produces radio frequency noise components, thereby preventing for the CD player to interfere with the reception of the broadcast waves.

However, as for the CD player, when the power thereof is turned on, it needs to initialize each section and read out information from a table of contents (TOC), accordingly, it is required a few seconds to complete all of these initializing processing.

Thereby, if the power of the CD player is arranged to be turned off during the reception of the broadcast waves, and when the source of the system stereo is switched from the AM broadcast tuner to the reproduction of a CD, a non-operable state of the system stereo occurs for such few seconds.

Of course, if the power of the CD player is kept turned on during the time of listening to the broadcast station, a CD can be immediately reproduced as soon as the source is switched from the reception of the broadcast station to the reproduction of CD. However, in this case, the above-mention problem of interference with the reception of broadcast waves is involved. The present invention is contemplated to solve the above-mentioned problems associated with the related art.

SUMMARY OF THE INVENTION

A novel audio apparatus provided according to an aspect of a preferred embodiment of the present invention is comprised of: a tuner unit for receiving broadcast; a digital reproducing unit; operating means for operating the tuner unit and the digital reproducing unit; a control unit for controlling the tuner unit and the digital reproducing unit in response to an operation of the operating means, wherein, in a first mode, when an audio signal outputted from the tuner unit is selectively received, the control unit controls to turn on the power of the digital reproducing unit; and wherein, in a second mode, when an audio signal outputted from the tuner unit is selectively received, the control unit controls to turn off the power of the digital reproducing unit, then to turn on the power thereof when selecting the audio signal outputted from the digital reproducing unit.

In the system stereo according to a preferred embodiment of the present invention, the power of the CD player is controlled as shown in FIG. 5, wherein if a CD power flag "CDPWRF" is set "CDPWRF=1", the power of the CD player is kept constantly ON thereby enabling to reproduce a CD instantly the function key is pushed, thus enabling the switching circuit to be switched to the CD player.

Alternatively, if it is set "CDPWRF=0", and if a broadcasting is being received, the power of the CD player is turned off. Thereby, in the case where a low level weak signal from a remote broadcasting station is being received, the interference by the radio frequency noise component from the CD player can be prevented. Namely, a user is able to select the defect to be eliminated of the system stereo by selecting operation mode according to the present invention.

Further, in a case where a new switch for switching the CD power flag "CDPWRF" is to be provided, it incurs an increase in the cost and a problem in determining where the new switch is to be installed. However, in the system stereo according to a preferred embodiment of the present invention, as it is arranged such that the switching of the CD power flag "CDPWRF" is effected only when a simultaneous operation of plural keys is executed, provided that the conditions (1) to (3), to be described later, are satisfied, wherein such combination of plural keys is most unlikely to occur in the normal use, and accordingly there is no need for providing any new key. Therefore, the increase in the cost and the problem of installing any additional new key are eliminated. Also, an erroneous operation of the keys is reduced.

The radio frequency noise components in the vicinity of AM band generated in the CD player are noted to have caused a significant problem to interfere, in particular, with the AM band. However, it should be noted also that it may interfere with the FM band. Further, other radio frequency noise components generated in other digital reproducing units, other than the CD player, such as a MD recording/reproducing unit, digital audio tape (DAT) recorder, digital versatile disc (DVD) player may also interfere with the AM band, FM band, or TV broadcasting. To such problems, the present invention is applicable.

BRIEF DESCRIPTION OF THE DRAWINGS

The above and other objects, features and advantages of the present invention will become more apparent from the following description of the presently preferred exemplary embodiment of the invention taken in conjunction with the accompanying drawings, in which:

FIG. 6 is a frontal view of the system stereo according to an embodiment of the present invention.

DETAILED DESCRIPTION OF THE PREFERRED EMBODIMENT

At first, configuration of an audio signal circuitry and its basic operations of the invention is described.

Figure 1:
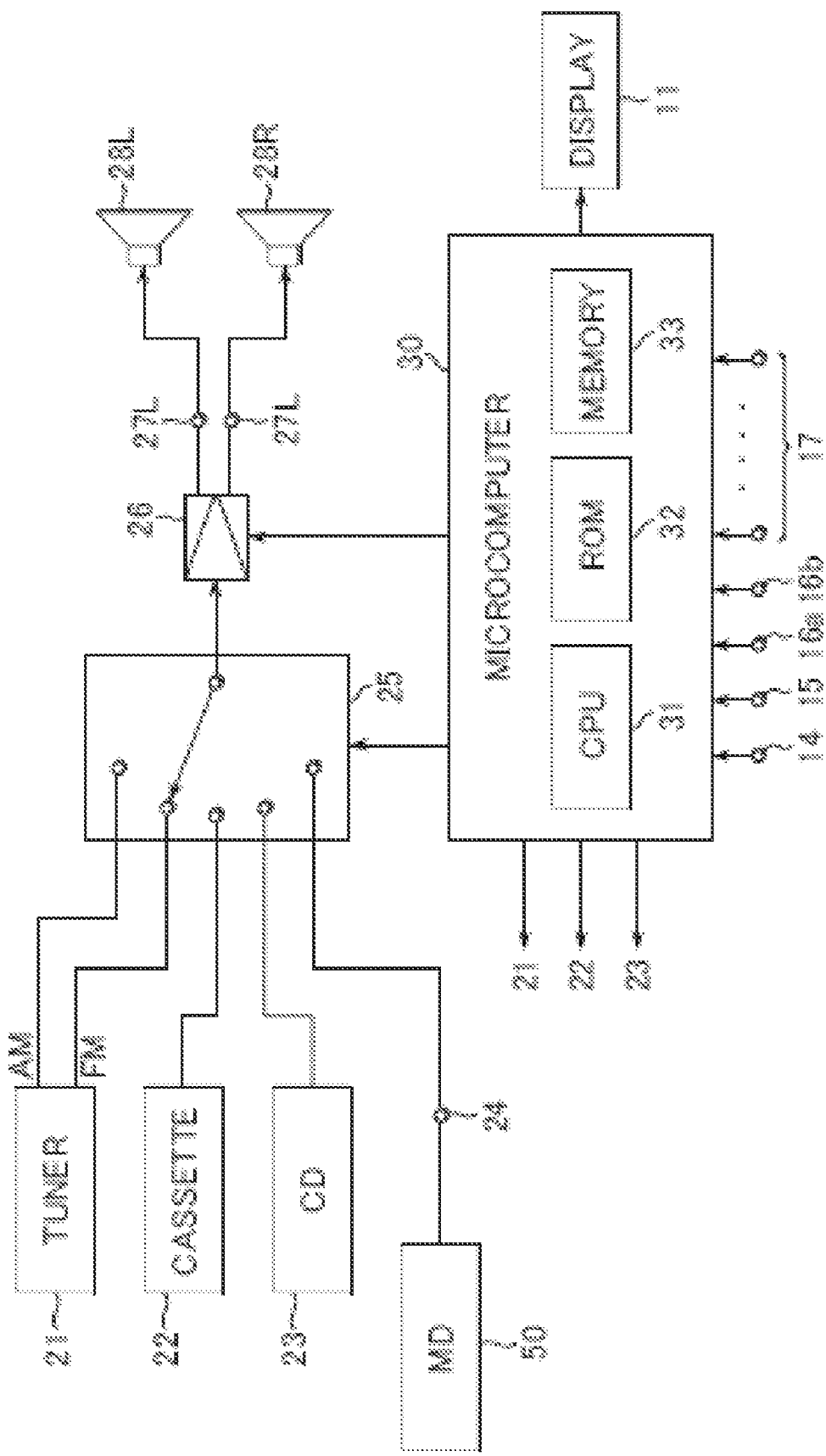
FIG. 1 is a schematic diagram showing a configuration of an audio signal circuitry in a system stereo according to an embodiment of the present invention.

FIG. 1 is a schematic diagram showing an audio signal circuitry in a system stereo according to an exemplary embodiment of the present invention. This exemplary embodiment specifies such one operable on AM/FM broadcasting, a CD and a cassette as its source, and, in addition, an MD recording/reproducing unit which is optionally connected. An appearance thereof as viewed from its front is given in FIG. 6.

By referring to FIG. 1, this system stereo has, as its sources, an AM/FM tuner 21, a cassette tape deck 22, a CD player 23, and a line input terminal 24. In this embodiment, the AM/FM tuner 21 which is a synthesizer type tuner and has a microcomputer (not shown) for control of reception, is constructed to be able to change a receiving band and a receiving frequency freely in response to a command accompanying data sent from a microcomputer 30 for use in a system control (to be described later).

Also, the cassette tape deck 22 and the CD player 23 have a microcomputer (not shown) for control of its operation, and are arranged to be able to change the operation mode thereof freely in response to the command and data from the microcomputer 30. Further, the input terminal 24 is connected to an external source optioned such as MD recorder/reproducer 50 for supplying optional audio signals therefrom.

Then, audio signals from the AM/FM tuner 21, cassette tape deck 22, CD player 23 and input terminal 24, i.e., those from the sources 21 to 24 are supplied to a switching circuit 25 which is provided for input source selection. This switching circuit 25 is controlled by the microcomputer 30 in response to an output (an instruction) from one of the function keys 15 so that a particular audio signal from a particular source from among a plurality of audio signals from a plurality of sources 21 to 24 is selected to be selected in response to the instruction entered via the function key 15.

Then, the audio signal selected via the switching circuit 25 is supplied to an amplifier 26, worked on processing of volume control, tone control, sound field calibration and so on, after then, supplied to left and right channel speakers 28L and 28R via output terminals 27L, 27R.

Figure 3:
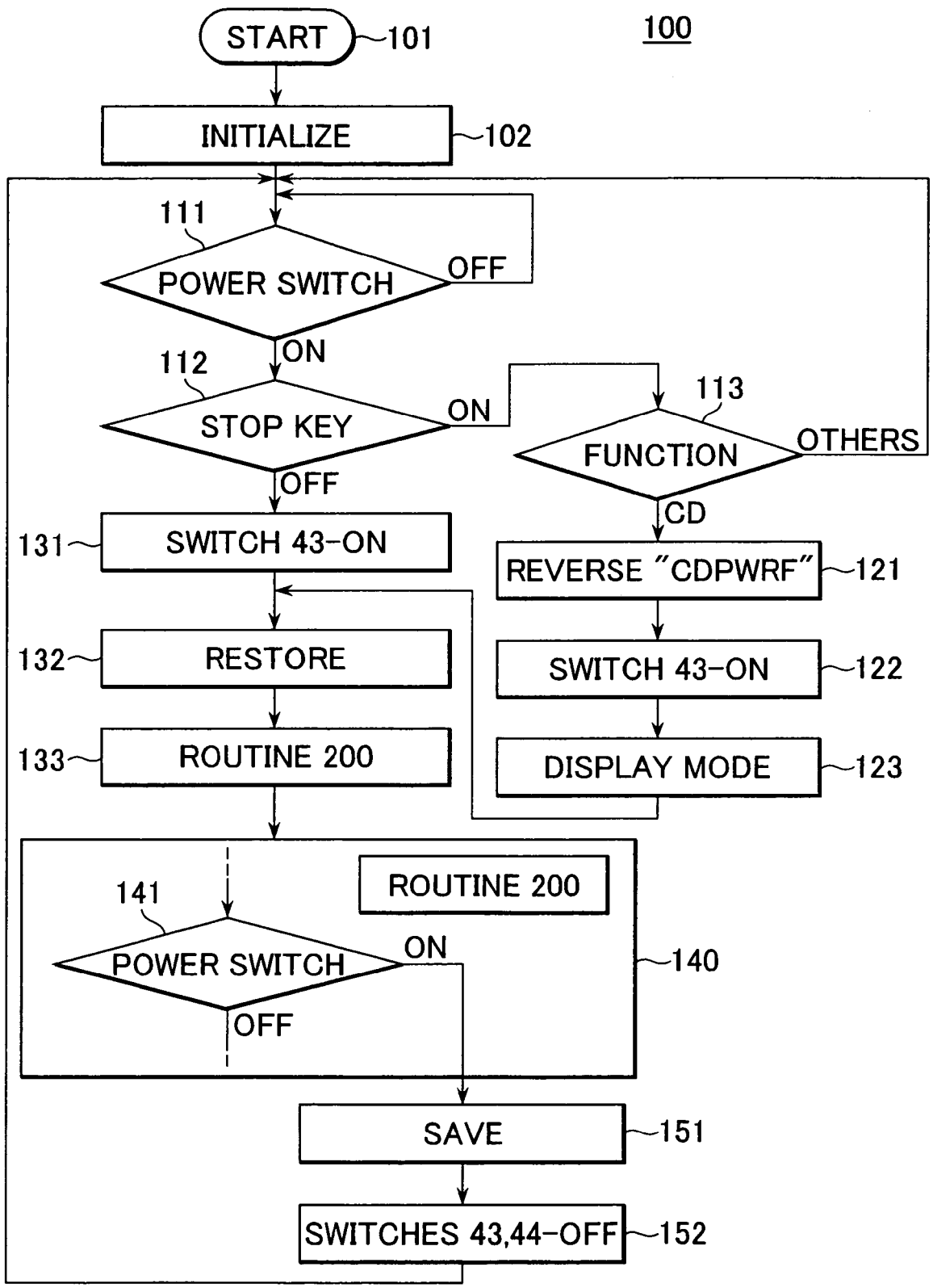
FIG. 3 is a flowchart showing procedures of operations according to the embodiment of the invention.
Figures 4, 5:
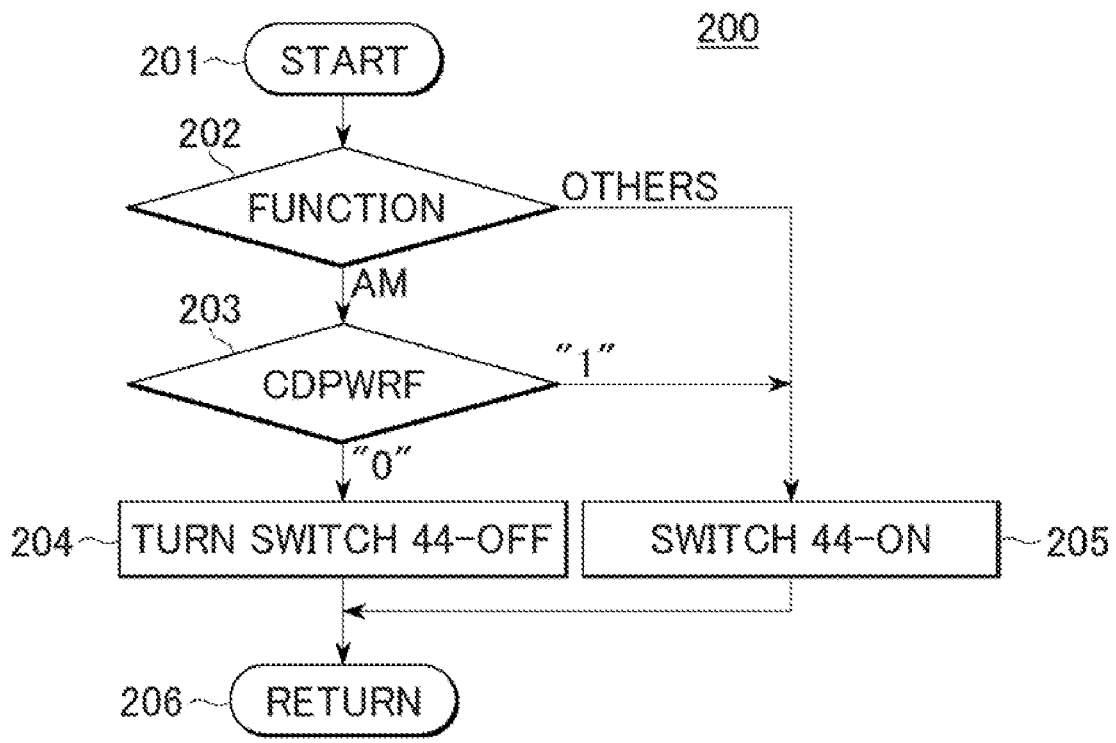
FIG. 4 is a flowchart showing the details of a part thereof shown in FIG. 3.
FIG. 5 is a block diagram showing exemplary modes of operation according to the present invention.

The microcomputer 30 for use of the system control as described above has a central processing unit (CPU) 31, a read only memory (ROM) 32 and a non-volatile memory 33. Various 20 programs for controlling the system stereo are stored on this ROM 32, and as a part of these programs, for example, routine 100, routine 200 as shown in FIGS. 3 and 4 are provided. The routines 100, 200 will be described more in detail later. In FIGS. 3 and 4, however, more specific parts thereof relating 25 to the present invention are extracted and shown.

The memory 33 is also used to retain information and data relating to a set-up or initialize of the system stereo, operational conditions thereof and the like. For example, if a power off operation is performed, data on the set-up or 30 initialize and its current operational state of the system is saved, and then if a power on operation for initializing the system stereo is performed, the preceding state of the system prior to the power off operation is restored.

Further, the microcomputer 30 is connected to a power key 14, function keys 15, volume up and down keys 16a, 16b, operation mode control keys 17 which include a record key, a playback key, a pause key, a rewind key, a music return key, a stop key, a music forward key, a quick forward key, etc., and also to a display 11. Various control signals are outputted from the microcomputer 30 and supplied to the sources 21 to 23, switching circuit 25 and the amplifier 26, respectively.

By way of example, as for the operation mode control keys 17, the record key is shared as a common key by the cassette tape recorder and the MD player, while the playback key, pause key, rewind key, music return key, stop key, music forward key and quick forward key are shared as common keys by the CD player, the cassette tape recorder and the MD player. In addition, the music return key and the music forward key are also used as a search key of a broadcast station for the tuner. Switching over between these keys is effected by pushing the function keys 15.

Thereby, if one of the function keys 15 is operated, the switching circuit 25 is controlled by the microcomputer 30 to select an audio signal of a particular source selected from the sources 21 to 24 corresponding to the operation of the function keys 15, and this selected audio signal is outputted as a reproduced sound from the speakers 28L, 28R. If the up or down keys 16a, 16b are operated at this instant, the level of the audio signal is changed by the amplifier 26 so as to adjust a volume level of the reproduced sound.

Still further, a prescribed display signal is formed in the microcomputer 30 to be supplied to the display 11, whereby particular source information, for example, a frequency of broadcast if during reception of a radio station is displayed on the display 11, or a track number, an elapsed time and the like is displayed if during reproduction of a CD.

Next, a configuration of the power circuitry and basic operation thereof is described.

Figure 2:
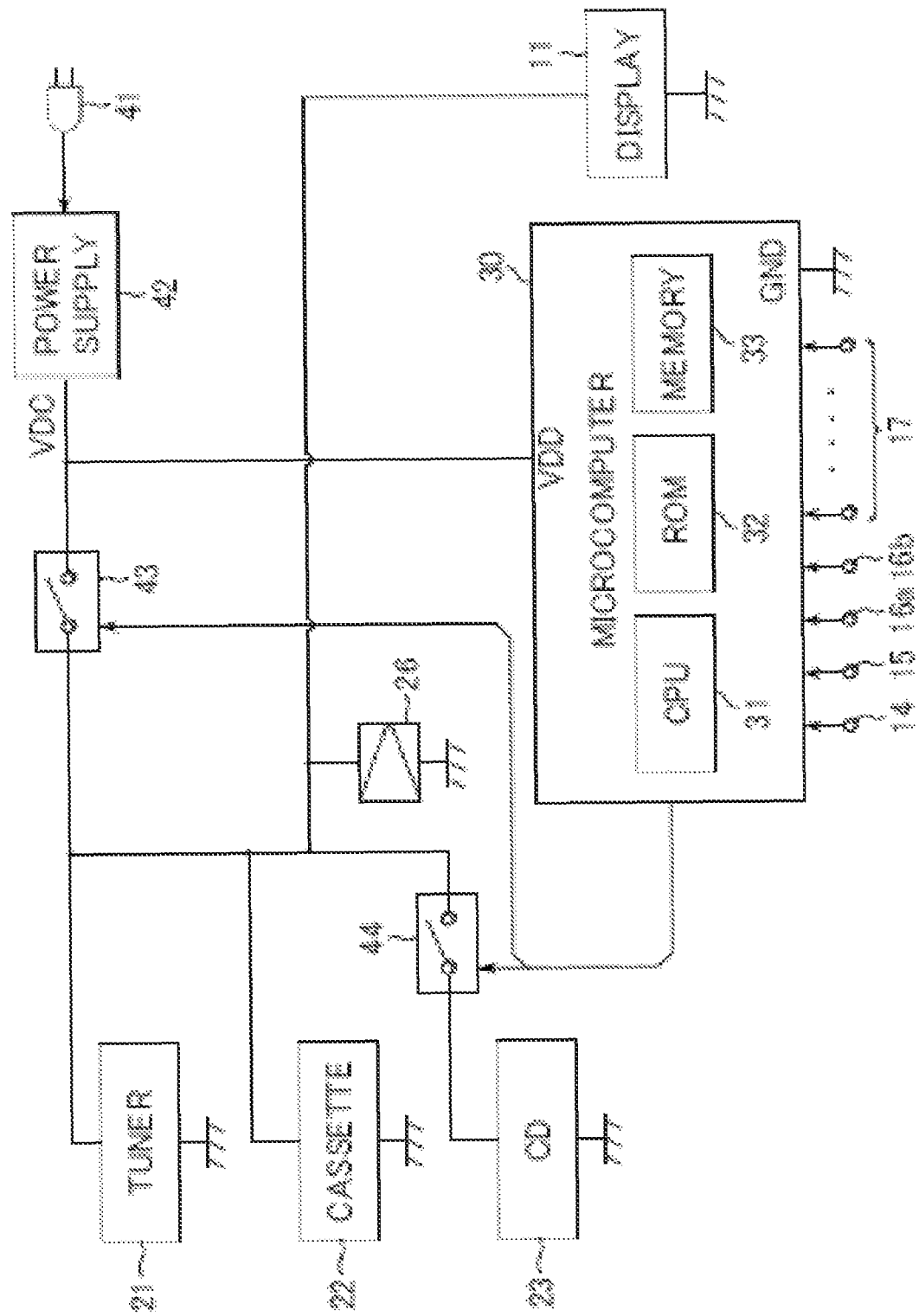
FIG. 2 is a schematic diagram showing a configuration of a power circuitry therein.

FIG. 2 is a schematic block diagram showing an example of a power circuitry of the system stereo described above. Namely, a commercial AC voltage is supplied via a power plug 41 to a power circuit 42 and rectified to a prescribed stable DC voltage VDC. This DC voltage VDC is supplied to the microcomputer 30 as an operational voltage.

Further, the DC voltage VDC from the power circuit 42 is also supplied via the switching circuit 43 to the AM/FM tuner 21, cassette tape deck 22, amplifier 26 and the display 11 as their operating voltage. Also, the DC voltage VDC outputted from the switching circuit 43 is supplied to the CD player 23 via a switching circuit 44 as its operating voltage. Further, a prescribed control signal is outputted from the microcomputer 30 and supplied to the switching circuits 43, 44 as their control signals.

Then, if the user operates the power key 14, the microcomputer 30 discriminates this operation, and in response to a control signal from the microcomputer 30, the switching circuit 43 is controlled to be turned on or off. In this instance, the state of the turn on and off of the switching circuit 43 is alternatively reversed every time the power key 14 is pushed. Thereby, every time the power key 14 is depressed, the power supply to this system stereo is switched over between ON and OFF.

Further, as will be described later, in dependence on a state of use of the CD player 23, the switching circuit 44 is controlled to become ON or OFF in response to a control signal from the microcomputer 30, thereby controlling the power supply to the CD player 23.

Now, the control of the power supply to the CD Player is described.

FIG. 5 shows an example of a power supply mode of the CD player 23. In this drawing of FIG. 5, a symbol "CD power flag CDPWF" indicates a flag for controlling the power of the CD player 23. Every time the user carries out a prescribed key operation, a value of this flag is switched alternatively between "0" and "1", for example, by the routine 100.

In the case of the routine 100, the switching of this flag "CDPWRF" is carried out if all of the following conditions (1) to (3) are met.

(1) The power of the system stereo is OFF as viewed from the user,
(2) In the condition of the above (1), a prescribed key operation is executed, for example, while depressing the stop key in the operation mode control keys 17, the power key 14 is pushed in conjunction therewith, and
(3) In the condition of the above (2), the switching circuit 25 is selected the CD player 23.

By way of example, the flag "CDPWRF" is stored in a non-volatile memory 33.

In dependence on the switching of the function keys and a value of the CD power flag "CDPWRF", the power mode of the CD player 23 is controlled as shown in FIG. 5. That is, although this control is executed by a routine 200, if the function key 15 selects reception of broadcasting (the switch 25 selects AM or FM reception signal outputs from the AM/FM tuner 21), and if "CDPWRF=1", the power of the CD player 23 is set ON. It is noted here that even if the function key selects any source other than the broadcasting, the power of the CD player is set ON.

However, if the function key 15 selects reception of broadcasting and if "CDPWRF=0", the power of the CD player 23 is turned OFF. Further, if the function key 15 selects another source other than reception of the broadcasting, then, irrespective of the values of the flag "CDPWRF", the power of the CD player 23 is set ON.

The routines 100 and 200 provided for realizing the above-mentioned processing have the following instructions. Namely, if the commercial AC voltage is connected to the power plug 41, processing by CPU 31 in the microcomputer 30 starts at step 101 in the routine 100, then in step 102, initialization of respective units is executed. In this initialization step, "CDPWRF=1" is assumed (default). By way of example, at this time, although the power of each unit becomes ON, the power of the system is OFF when viewed from the user.

Subsequently, the process moves from step 102 to step 111. In this step 111, the process is in a standby mode waiting for operation of the power key 14. That is, if the user pushes the power key 14 in this mode, this system stereo becomes operable instantly.

Switching of the CD power flag "CDPWRF" is described as follows.

In case of switching the CD power flag "CDPWRF", in the off-state of the power (under the condition (1) described above), a prescribed key operation is performed, i.e., the power key 14 is pushed while also pushing the stop key in the operation mode control keys 17. Then, upon the push down operation of the power key 14, the process moves from step 111 to step 112. In step 112, whether or not the stop key in the operation mode control keys 17 is pushed is determined. In this instance, as an elapsed time from the operation of the step 111 to that of step 112 is instantaneous, as a result, it is considered to verify simultaneous operations (push-down) of both the stop key and the power key 14 in the step 112.

In this instant case, because both the stop key and the power key 14 are pushed simultaneously as prescribed (the condition (2) holds), the process moves from step 112 to step 113. In this step 113, by judging whether or not the switching circuit 25 is selected the CD player 23, it is determined for the function whether it is switched to the CD or not.

If determined to be switched to the CD (if the condition (3) holds), the step moves from step 113 to step 121. In this step 121, its CD power flag "CDPWRF" is reversed. That is, if currently "CDPWRF=1", it is reversed to "CRPWRF=0", alternatively if currently "CRPWRF=0", it is reversed to "CDPWRF=1". By way of example, in no steps other than this step 121, the CD power flag "CDPWRF" will be operated.

Subsequently, the process advances to step 122. In step 122, the switching circuit 43 is controlled to become ON, thereby turning on the powers of the AM/FM tuner 21, cassette tape deck 22, amplifier 26 and display 11. Then, the step goes to step 123. In this step 123, a prescribed display signal is supplied to the display 11, and a power mode of the CD player 23 is displayed on the display 11.

That is, if "CDPWRF=1", a message "CD POWER ON" is displayed on the display 11, and if "CDPWRF=0", a message "CD POWER OFF" is displayed thereon. Then, after this message indicating the power mode of the CD player 23 is displayed, for example, for 3 seconds, the process jumps from step 123 to step 132.

Therefore, whenever the operation under conditions (1) to (3) is executed, the CD power flag "CDPWRF" is alternatively switched between "0" and "1" for each operation. Further, in accordance with a result of its switching, the power mode of the CD player 23 is displayed on the display 11.

In the step 113, if the function is not switched to CD player 23 (if the condition (3) does not hold), the process returns from step 113 to step 111, and thus the switching of the CD power flag "CDPWRF" is not executed.

By way of example, the accomplishment of the condition (2) is determined by a prescribed key operation, for example, a simultaneous push-down operation of a plurality of keys, i.e., the stop key in the operation mode control key 17 and the power key 14 in combination. In this instance, the stop key and the power key already exist, and this combination of the two keys to be operated simultaneously is selected from those that are most unlikely to occur in a normal use.

Operation of normal use is described with regard to the power control of the CD Player 23.

In case of a normal use, for example, such as receiving broadcasting or reproducing a CD, the power key 14 is pushed alone if the power is cut off. Then, the process advances from step 111 to step 131 via step 112. In this step 131, the switching circuit 43 is controlled to become ON, thereby causing the powers of the AM/FM tuner 21, cassette tape deck 22, amplifier 26 and display 11 to be turned on.

Subsequently, the process goes to step 132. In this step 132, on the basis of information saved in memory 33, a preceding switching position in the switching circuit 25, a preceding audio signal level in the amplifier 26 and the like are read out to restore a previous state immediately before the power was cut off last time. Then, the process goes to step 133.

In this step 133, the routine 200 is called in and executed, and then the power of the CD player 23 is controlled as shown in FIG. 5. Also by referring to FIG. 4, when the processing of CPU 31 is transferred to routine 200, it starts at step 201, and in a subsequent step 202, it is judged whether or not the switching circuit 25 is switched to the output of the AM/FM tuner 21.

Then, if the switching circuit 25 is switched to the output of the AM/FM tuner 21, the process goes from step 202 to step 203. In this step 203, its CD power flag "CDPWRF" is judged. If "CDPWRF=0", the process goes from step 203 to step 204. In this step 204, the switching circuit 44 is controlled to become OFF, thereby causing the power of the CD player 23 to be turned off. Then, in step 206, the routine 200 ends, and the process returns to the routine 100.

Further, in step 202, if the switching circuit 25 is switched to any source other than the output from the AM/FM tuner 21, the process jumps from step 202 to step 205. Also, in step 203, if "CDPWRF=1", the process jumps from step 203 to step 205. In this step 205, the switching circuit 44 is controlled to become ON, thereby causing the power of the CD player 23 to be turned on. Subsequently, in step 206, the routine 200 is ended.

Therefore, according to the routine 200, corresponding to the status of function switching and the value of the CD power flag "CDPWRF" while the routine 200 is executed, the power of the CD player 23 is controlled as shown in FIG. 5.

As a result, if the power key 14 is pushed alone when the power is OFF, the powers of the AM/FM tuner 21, cassette tape deck 22, amplifier 26 and display 11 are turned on in step 131 (FIG. 3), and at the same time, the power of CD player 23 is controlled to become ON or OFF in step 133 in routine 200 (FIGS. 3 and 4). That is, the power of the system stereo becomes ON as viewed from the user.

Then, the process of CPU 31 in routine 100 after step 133 goes to step 140. In this step 140, in accordance with the operations of function keys 15, volume key 16 and operation mode control keys 17, a switching operation between the sources 21 to 24, control of volume and the like are executed, thereby allowing this system stereo to be used in a normal mode of operation as designated by the operation of the keys 15 to 17.

However, in this step 140, it should be noted that, every time the switching circuit 25 is switched over by the operation of the function keys 15, the routine 200 is called in and executed so as to control the power of the CD player 23 as shown in FIG. 5.

Then, in any state of use, if the power key 14 is pushed, the operation of which is discriminated by step 141 in routine step 140, the process goes from step 141 to step 151. In this step 151, the information at use in step 132 is saved in memory 33. In the following step 152, the switching circuits 43 and 44 are disconnected thereby cutting off the power of the system. Then, the process returns to step 111.

Thereby, if the power key 14 is pushed under this condition of the power OFF, this system stereo can be used as a normal system stereo.

What is claimed is:

1. An audio apparatus comprising:
a tuner unit for receiving a broadcast;
a digital reproducing unit;
a line input unit;
an operating unit;
an amplifier unit;
a switching unit which switches a signal sent to the amplifying unit between the tuner unit, the digital reproducing unit and the line input unit; and
a control unit which switches between a first mode and a second mode in response to the selected signal sent to the amplifying unit and at least two predetermined user inputs of the operating unit,
wherein,
in the first mode when the tuner unit is selected by the switching unit, the power to the digital reproducing unit is on while the tuner unit receives the broadcast and sends the broadcast to the amplifier unit; and
in the second mode when the tuner unit is selected by the switching unit, the power to the digital reproducing unit is off while the tuner unit receives the broadcast and sends the broadcast to the amplifier unit.

2. The audio apparatus as recited in claim 1, wherein:
the at least two predetermined user inputs are a simultaneous operation of at least two input keys.

3. The audio apparatus as recited in claim 1 or claim 2, wherein:
the digital reproducing unit reproduces digital data recorded on a recording media, and the tuner unit receives at least a AM or FM broadcast.

4. The audio apparatus as recited in claim 1, wherein:
the at least two predetermined user inputs are configured to change said control unit from said first mode to said second mode and to change said control unit from said second mode to said first mode.

5. The audio apparatus as cited in claim 1, further comprising:
a display unit for displaying information which indicates the current mode when said first mode and said second mode are switched by said control unit.

6. A method for controlling an audio unit comprising the steps of:
receiving a broadcast at a tuner unit; switching a signal sent to an amplifying unit between the tuner unit, a digital reproducing unit and a line input unit by a switching unit;
switching the audio unit between a first mode and a second mode in response to a predetermined operation of an operating unit when the tuner is selected by the switching unit,
turning off or on power to a digital reproducing unit based on the mode of the audio unit and in response to a predetermined user input.

7. The method of claim 6 wherein, the predetermined operation is a simultaneous operation of plural keys.

8. The method of claim 6 wherein, the digital reproducing unit reproduces digital data recorded on a recording media, and the tuner unit receives at least a AM or FM broadcast.

9. The method of claim 6 wherein, the predetermined operation for changing the control unit from said first mode to said second mode and for changing said control unit from said second mode to said first mode are the same.

10. The method of claim 6 further comprising the step of, displaying information indicating the current mode on a display unit when said first mode and said second mode are switched by said control unit.

* * * * *